(12) United States Patent
Mall et al.

(10) Patent No.: US 8,945,248 B2
(45) Date of Patent: Feb. 3, 2015

(54) BIOFILTER ASSEMBLIES FOR BIOMASS GASIFICATION SYSTEMS

(75) Inventors: Omprakash Mall, Bangalore (IN); Amol Mahulkar, Bangalore (IN)

(73) Assignee: General Electric Company, Schenectady, NY (US)

( * ) Notice: Subject to any disclaimer, the term of this patent is extended or adjusted under 35 U.S.C. 154(b) by 807 days.

(21) Appl. No.: 13/157,234

(22) Filed: Jun. 9, 2011

(65) Prior Publication Data
US 2012/0311991 A1     Dec. 13, 2012

(51) Int. Cl.
*B01J 7/00*    (2006.01)

(52) U.S. Cl.
USPC .......... 48/61; 48/76; 48/127.9; 48/127.1; 210/391; 435/266

(58) Field of Classification Search
USPC .......... 48/61, 127.9, 127.1; 210/391; 435/266
See application file for complete search history.

(56) References Cited

U.S. PATENT DOCUMENTS

| | | | |
|---|---|---|---|
| 6,117,672 A * | 9/2000 | Breckenridge | 435/266 |
| 7,097,046 B2 * | 8/2006 | Calabrese | 210/391 |
| 7,951,350 B1 * | 5/2011 | Taylor | 423/418.2 |
| 2003/0008381 A1 * | 1/2003 | Augenstein | 435/266 |
| 2003/0082794 A1 * | 5/2003 | Haridas et al. | 435/266 |
| 2008/0085547 A1 * | 4/2008 | Herner et al. | 435/266 |
| 2009/0093042 A1 * | 4/2009 | Husain et al. | 435/252.1 |

FOREIGN PATENT DOCUMENTS

EP     1 203 802 A1     5/2002

OTHER PUBLICATIONS

Williams, R. H and Larson, E. D.; "Biomass Gasifier Gas Turbine Power Generating Technology"; Pergamon; Biomass and Bioenergy, vol. 10, Nos. 2-3, pp. 149-166, 1966.

* cited by examiner

*Primary Examiner* — Kaity V. Handal
(74) *Attorney, Agent, or Firm* — Fletcher Yoder P.C.

(57) ABSTRACT

Biomass gasification systems including a biofilter assembly adapted to be disposed within a filter unit of a biomass gasification system are provided. The biofilter assemblies may be adapted to filter particulate matter from a producer gas flowing through the filter unit while allowing a remainder of the producer gas to pass through the biofilter assembly. The biofilter assembly may include a support structure and a biofilter disposed on the support structure and including a biomaterial adapted to be gasified in a biomass gasification reactor of the biomass gasification system.

20 Claims, 4 Drawing Sheets

BIOFILTER ASSEMBLIES FOR BIOMASS GASIFICATION SYSTEMS

BACKGROUND OF THE INVENTION

The subject matter disclosed herein relates generally to gasification systems, and more particularly, to biofilter assemblies for biomass gasification systems.

Gasification is a process that is often employed in various industries and applications for conversion of a lower, less readily usable type of fuel into a higher form of fuel. For example, biomass gasification systems are utilized in a variety of types of power plants to convert biomass into a more combustible form, referred to as producer gas. In some systems, the producer gas may be combusted by an engine to produce electricity. In other systems, the producer gas may be used to generate heat or to generate substitute natural gas (SNG).

Very generally, producer gas is a type of synthesis gas (syngas), formed by the relatively low temperature gasification of biomass, typically in the presence of air. The producer gas includes combustible gases, such as carbon monoxide, carbon dioxide, hydrogen, methane, and nitrogen, and can be combusted to generate power. Further, the producer gas can be utilized to make methanol, ammonia, and diesel fuel through known commercial catalytic processes. In such a way, various forms of organic waste, such as wood, coconut shell fibers, and alcohol fuels, may be gasified for use in the production of electricity for a variety of downstream applications. However, prior to use in a power generation system, the producer gas may need to be cooled and/or cleaned to generate a gas mixture that has a desirable temperature and composition for combustion. To that end, many current systems utilize cloth or bag filters to remove fine particulates. However, once these filters reach their usage limit, these filters are typically removed, discarded, and replaced.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a biomass gasification system includes a biofilter assembly adapted to be disposed within a filter unit of a biomass gasification system. The biofilter assembly is adapted to filter particulate matter from a producer gas flowing through the filter unit while allowing a remainder of the producer gas to pass through the biofilter assembly. The biofilter assembly includes a support structure and a biofilter disposed on the support structure and including a biomaterial adapted to be gasified in a biomass gasification reactor of the biomass gasification system.

In a second embodiment, a biomass gasification system includes a feedstock preparation unit adapted to process biomass to generate a biomass feedstock. The biomass gasification system also includes a biomass gasification reactor adapted to gasify the biomass feedstock in the presence of air to generate producer gas. Further, the biomass gasification system includes a filter unit including a biofilter adapted to filter particulate matter from the producer gas to generate a reduced particulate producer gas. At least a portion of the biofilter includes a biomaterial configured to be gasified in the biomass gasification reactor.

In a third embodiment, a method includes directing a producer gas through a biofilter to remove particulates from the producer gas, the biofilter including a biomaterial. The method also includes feeding the biofilter to a biomass gasification reactor to gasify the particulates.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed to biofilter assemblies that include biofilters that can be employed in biomass gasification systems to remove particulates, such as tar, from producer gas. The spent biofilters containing the removed particulates can then be fed to the biomass gasifier to allow gasification of the biofilters and/or the particulates retained by the filters. Otherwise, the removed particulates may not be recovered, and thus become waste. Thus, the disclosed embodiments reduce waste and increase efficiency of the plant by recovering the otherwise wasted particulate contained in the spent biofilters. In general, producer gas is a type of synthesis gas (syngas) that may be produced by the relatively low temperature (e.g., less than approximately 2000-1200° C.) gasification of biomass, typically in the presence of air. When compared to other types of synthesis gas produced by coal gasification in the presence of oxygen, producer gas generally has a lower energy density due to the gasification in the presence of air, rather than oxygen. As used herein, the term "biofilters" refers to any filter that is at least partially made of a biomaterial (e.g., biodegradable materials of plant origin). According to certain embodiments, the biofilters may include components such as polysaccharides that have been produced by photosynthesis (e.g., cellulose, hemicellulose, and lignin, among others).

The biofilters can be utilized in biomass gasification systems to remove particulates from producer gas generated by the gasification of biomass within a gasifier. The producer gas exiting the gasifier can include varying concentrations of gases such as carbon monoxide, carbon dioxide, hydrogen, methane, and nitrogen, as well as particulate matter, such as tar. The biofilters can remove fine particulate matter from this producer gas and, in certain embodiments, may be disposed downstream of other particulate removal equipment, such as cyclones and scrubbers, among others. After retaining a certain amount of particulate matter, the biofilters may reach a usage limit beyond which they are no longer capable of retaining optimal functionality (i.e., can no longer properly filter the producer gas). Once the biofilters reach their usage limit, the spent biofilters can be fed to the gasifier to allow gasification of the biofilters themselves, as well as the particulate material, such as tar, that is retained by the biofilters. Accordingly, the biofilters described herein may be used to both remove particulates from producer gas and to provide a biomass feed source for the biomass gasifier. The foregoing features of embodiments of the present invention may offer distinct advantages over traditional biomass gasification systems that typically do not utilize biomaterials in the fine particulate filters. For example, such embodiments may enable reuse of the fine particulate matter (e.g., tar) adhered to the used biofilters and may also eliminate the need to dispose of the used filters.

Figure 1:
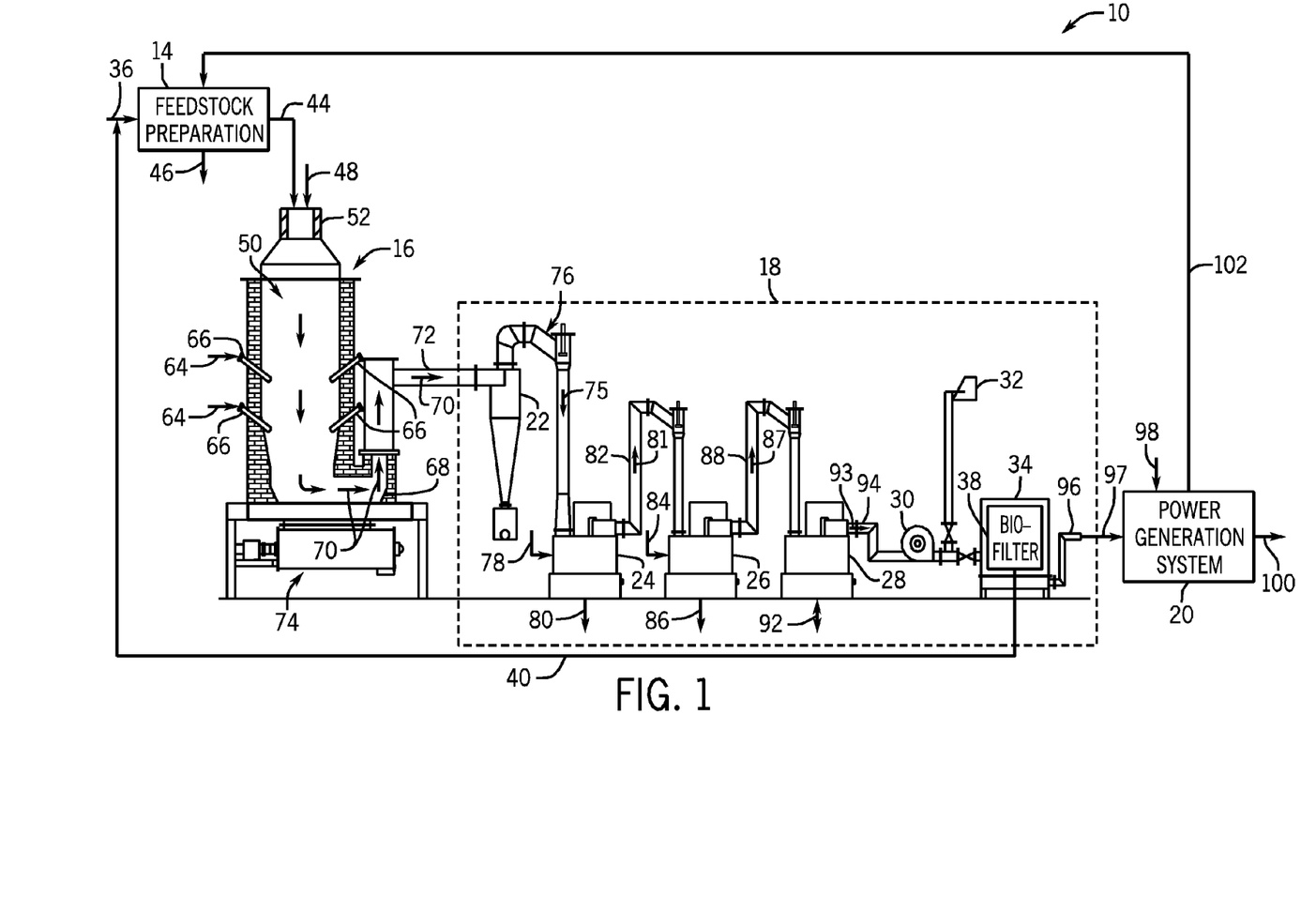
FIG. 1 is a block diagram of a biomass gasification system depicting recycle of a biofilter to a feedstock preparation unit in accordance with present embodiments.
Figure 2:
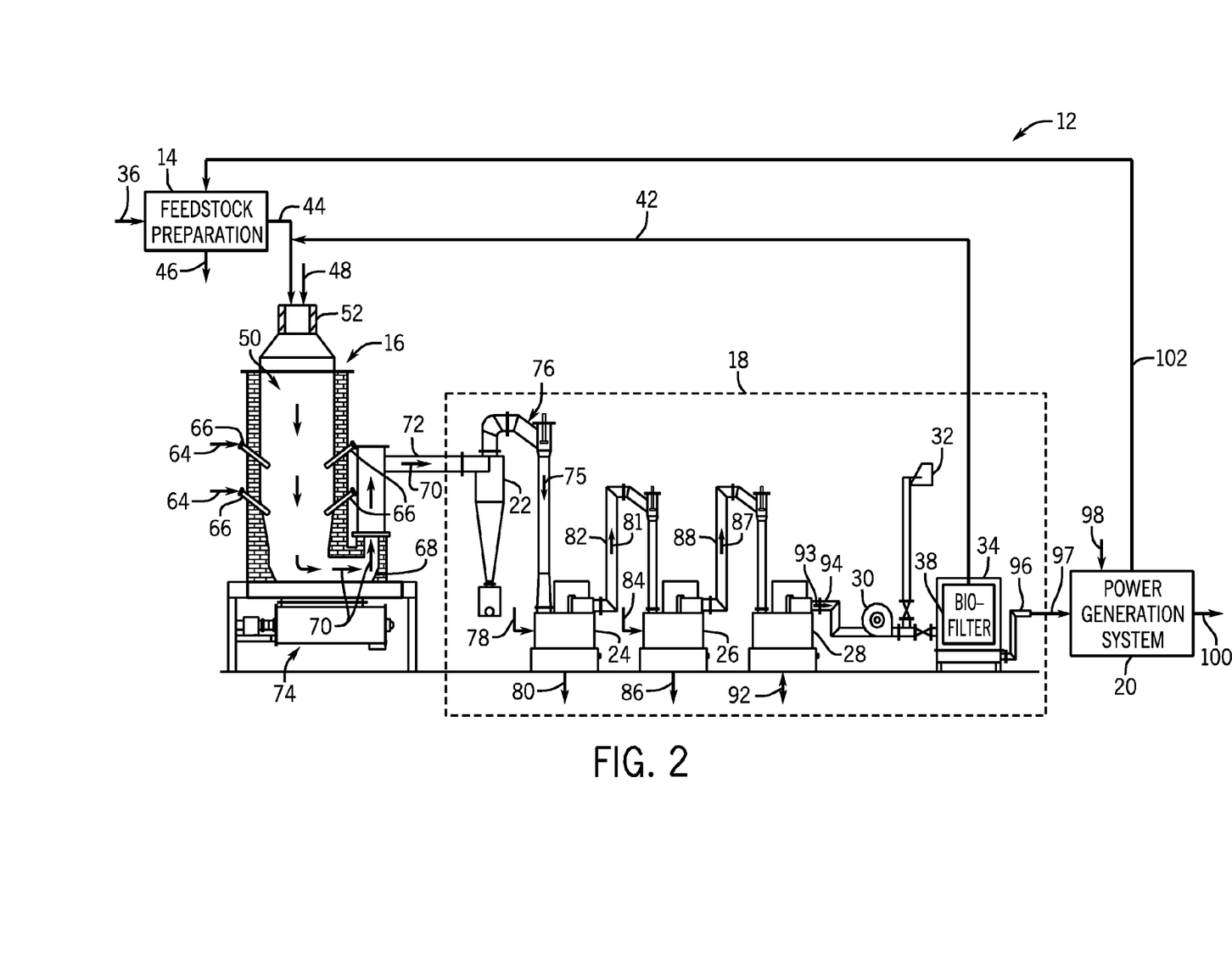
FIG. 2 is a block diagram of a biomass gasification system depicting recycle of a biofilter to a gasifier in accordance with an embodiment.

Turning now to the drawings, FIGS. 1 and 2 depict biomass gasification systems 10 and 12 that are configured to thermally convert biomass into a more useful gaseous form of fuel (i.e., a fuel form that can be economically utilized with high energy recovery levels) and, subsequently, to clean and cool the gaseous fuel produced via the thermal conversion process. To that end, the biomass gasification systems 10 and 12 include a feedstock preparation unit 14, a biomass gasifier 16, a cleaning and cooling subsystem 18, and a power generation system 20. The cleaning and cooling subsystem 18 includes a cyclone 22, a first scrubber 24, a second scrubber 26, a third scrubber 28, a blower 30, a flare 32, and a filter unit 34. Various conduits are provided that connect these components of each of the respective biomass gasification systems 10 and 12 together, thereby enabling fluid flow between the components, as described in detail below. Further, although the illustrated cleaning and cooling subsystem 18 includes a cyclone 22 and three scrubbers 24, 26, and 28, in other embodiments, the type and/or configuration of equipment included in the cleaning and cooling subsystem 18 may vary. For example, in other embodiments, multiple cyclones may be included, different numbers of scrubbers may be included, or the scrubbers and/or cyclone may be omitted. Further, in certain embodiments, the cleaning and cooling subsystem 18 may include multiple filter units 34 that may be disposed in series or in parallel to receive particulate laden producer gas from the cyclone 22, and/or the scrubbers 24, 26, and/or 28.

During operation of the biomass gasification systems 10 and 12, biomass, as indicated by arrow 36, is utilized as a natural energy source to generate a more readily usable fuel form, such as producer gas. To that end, the biomass 36 may take the form of any natural or organic material having a molar energy content. For example, the biomass 36 may include one or more of alfalfa straw, bean straw, barley straw, coconut shell, coconut husks, corn cobs, corn fodder, cotton stalks, peach pits, peat, prune pits, rice hulls, safflower, sugarcane, walnut shell, what straw, wood blocks, wood chips, or any other suitable organic feed material. For further example, in certain embodiments, the biomass 36 may take the form of a used biofilter, such as a biofilter 38 utilized in the filter unit 34. In such embodiments, the used biofilter, as well as the material adhered thereto after use, may be reused in the gasification system as a fuel source after its filtering capacity has been exhausted.

The used biofilter 38 can be provided to the gasifier 16 either upstream or downstream of the feedstock preparation unit 14. For example, as shown in FIG. 1, the used biofilter 38 can be mixed with the biomass 36 as indicated by arrow 40. The biomass 36 and the biofilter 38 can be processed in the feedstock preparation unit 14 and can then be directed to the gasifier 16 as processed feed 44. In other embodiments, the used biofilter 38 can be provided directly to the gasifier 16. For example, as shown in FIG. 2 by arrow 42, the used biofilter 38 can be combined with the biomass exiting the feedstock preparation unit 14 as processed feed 44 and then the biomass feedstock and the biofilter 38 can be directed to the gasifier 16. In these embodiments, the used biofilter 38 may not be processed in the feedstock preparation unit 14 prior to entering the gasifier 16. Further, in other embodiments, the used biofilter 38 may be directed to the gasifier 16 as a separate feed that is not combined with other forms of biomass prior to entering the gasifier 16.

During operation, the biomass 36 is introduced into the biomass gasifier 16 through the feedstock preparation unit 14. Depending on the form of the incoming biomass 36, the feedstock preparation unit 14 may resize and/or reshape the biomass 36, for example, by chopping, milling, shredding, pulverizing, briquetting, or palletizing the biomass 36. In some embodiments, the feedstock preparation unit 14 may reduce the volume of the biomass 36 via densification to a uniformly dimensioned fungible fuel that is sized and shaped to maximize the efficiency of the gasifier 16. In other embodiments, the preparation unit 14 may receive the biomass 36 as a uniform fuel source and may further process the fuel to customize the processed feed 44 for compatibility with the given gasifier 16 (e.g., by reducing or increasing moisture content). In instances in which the biomass 36 is partially or completely dried, the feedstock preparation unit 14 may emit a dryer exhaust 46 as part of the drying process.

After processing in the feedstock preparation unit 14, the processed feedstock 44 enters a chamber 50 of the gasifier 16 via inlet 52, along with air 48. The depicted biomass gasifier 16 is an open-air gasifier where the inlet 52 enables the gasifier 26 to receive a substantially constant influx of the air 48 and the biomass feedstock 44. Further, although the gasifier 16 is depicted as a downdraft style gasifier, in other embodiments, a variety of suitable types of biomass gasifiers may be employed. For example, the disclosed embodiments are compatible with various types of gasifiers, such as updraft style gasifiers and crossdraft gasifiers. As may be appreciated, the gasifier type chosen for a given gasification system may be dictated by features of the biomass in its final fuel form, such as its size, moisture content, and ash content. For example, in the embodiment of FIG. 2, the used biofilter 38 may have substantial amounts of tar adhere thereto when recycled directly into the feedstock 44 being fed to the gasifier 16. Therefore, a downdraft gasifier may be chosen due to its relative insensitivity to the dust and tar content of the fuel as compared to updraft or crossdraft systems.

In the chamber 50, the processed feedstock 44 is gasified in the presence of air 48 to generate producer gas with varying concentrations of gases such as carbon monoxide, carbon dioxide, hydrogen, methane, and nitrogen. A series of reactions, which are collectively referred to as the gasification process, occur within the biomass gasifier 16. The process begins with combustion of the biomass feedstock 44 and the air 48. The biomass within the biomass feedstock 44, and within the biofilter 38, is combusted at sub-stoichiometric fuel-to-air ratios to produce, along with some carbon monoxide and hydrogen, carbon dioxide, water, and a char or ash bed, which contains hot carbon. The biomass gasifier 16 includes a plurality of air inlets 66 (e.g., nozzles) that are configured to allow air 64 to enter the biomass gasifier 16 to promote this combustion reaction. According to certain embodiments, the air inlets 66 may be spaced circumferentially around the biomass gasifier 16.

The combustion reaction, which is an oxidation reaction, is exothermic and produces, in certain embodiments, temperatures within the biomass gasifier 16 of between approximately 1300 Kelvin (K) and 1600 K. As an example, the temperatures within the biomass gasifier 16 may reach approximately 1300 K, 1350 K, 1400 K, 1450 K, 1500 K, 1550 K, 1600 K, or more during the sub-stoichiometric combustion reaction. The carbon dioxide and water produced by the combustion reaction may pass through, or otherwise contact, the char or ash bed and undergo a reduction to generate carbon monoxide, hydrogen, and some methane.

The reduction reaction that is performed to produce the carbon monoxide and hydrogen is endothermic, and therefore requires heat. The bulk of the reduction reaction may therefore use heat produced by the combustion reaction, and also any latent heat from the hot char or ash bed. Moreover, because the biomass gasifier 16 is an open-top gasifier, the temperatures within the gasifier 16 may also be reduced by a substantially constant influx of the air 48. Other materials are generated from the gasification process in addition to the desired carbon dioxide and hydrogen gases, including tar.

The reduction reaction, as noted above, produces carbon monoxide, hydrogen, tar, and other gases (e.g., diluent $N_2$, acid gases), which collectively form an untreated producer gas mixture 70. The composition of the producer gas 70 is subject to considerable variations and depends on factors such as the fuel type, operational parameters of the biomass gasifier, and so forth, and may include varying concentrations of gases such as carbon monoxide, hydrogen, methane, carbon dioxide, and nitrogen. The untreated producer gas mixture 70 exits an outlet 68 of the biomass gasifier 16 at a temperature between approximately 600 and 1300 K, and all subranges therebetween. For example, the temperature at the outlet 68 may be approximately 600 K, 700 K, 800 K, 900 K, 1000 K, 1100 K, 1200 K, 1300 K, or more. The untreated producer gas mixture 70 is then directed through a conduit 72 for transmission to the cleaning and cooling subsystem 18.

Concurrent with the flow of the untreated producer gas mixture 70 through the outlet 68 of the gasifier 16, hot ash exits the gasifier 16 via an ash extraction system 74. The hot ash may be derived from the mineral content of the fuel that remains in oxidized form. The ash extraction system 74 receives the hot ash generated during the biomass gasification process and contains the hot ash for subsequent removal from the biomass gasifier 16. If desired for the given application, one or more heat exchangers may be placed in the ash extraction system 74 to cool the hot ash via convection.

The hot ash remains in the ash extraction system 74 for removal. However, the untreated producer gas mixture 70 flows through the conduit 72 to the cyclone 22, which may be operated to remove dust and other particles from the untreated producer gas mixture 70 to produce a gas mixture 75 that contains fewer particulates than the gas mixture 70. For example, in certain embodiments, the cyclone 22 may be used to filter out particles equal to and greater than approximately 5 micrometers, approximately 4 micrometers, approximately 3 micrometers, approximately 2 micrometers, or approximately 1 micrometer. In some embodiments, approximately 60 to 65 percent of the producer gas may comprise particles greater than 60 micrometers in size; therefore, the cyclone 22 may remove a large number of particles from the untreated producer gas mixture 70. As such, in many embodiments, large particulates may be pre-filtered from the producer gas prior to reaching the biofilter 38 in a downstream cleaning operation.

From the cyclone 22, the producer gas mixture 75 flows through a conduit 76 to the first scrubber 24 where the producer gas is cleaned, for example, by removing fines, tar, and entrained gases, such as hydrogen chloride. In particular, within the first scrubber 24, fines and tar may be separated from the producer gas with water, as indicated by arrow 78, to produce a stream of black water that exits a bottom portion of the first scrubber 24 indicated by arrow 80. The scrubbed producer gas exits 81 the first scrubber 24 and is transferred to the second scrubber 26 via a conduit 82.

In the second scrubber 26, additional fines, tar, and gases may be removed with water 84. The fines and tar may be separated from the producer gas to produce a second stream of black water 86 that may exit a bottom portion of the second scrubber 26. According to certain embodiments, the black water 80 and 86 exiting the bottom portions of the first scrubber 24 and the second scrubber 26 may be directed to a black water processing system. In such embodiments, the black water processing system may include a series of flash tanks that subject the black water 80 and 86 to a series of pressure reductions to remove dissolved gases and to separate and/or concentrate the fines. The separated fines may be recycled and used in the feedstock preparation unit 14 to provide additional fuel for the biomass gasifier 16 if desired.

The scrubbed producer gas 87 exiting the second scrubber 26 flows through a conduit 88 to the third scrubber 28, which, in certain embodiments, may be a chilled water scrubber. In the third scrubber 28, the producer gas may be cooled with chilled water 92 that flows into the third scrubber 28, exchanges heat with the hot producer gas, and, subsequently, flows back to a chilled water tank where the water is cooled for recirculation. The chilled water 92, which is atomized in the scrubber 28, also scrubs the producer gas 87 to remove a substantial portion of any particulates that may be present. Therefore, the chilled water 92 may absorb or otherwise entrain particulates, as well as acid gases and the like, to produce a stream of grey water 92. The stream of grey water 92 may be sent to a chilled water tank, a water treatment facility, or a similar plant feature.

The cooled producer gas 93 flows through a conduit 94 to the blower 30. The blower 30 is operated to pull the producer gas 70, 75, 81, 87, and 94 from the biomass gasifier 16 through the gas cleaning and cooling subsystem 18. During operation, in certain embodiments, an excess portion of the producer gas may be burned by the flare 32.

The producer gas 93 that is not directed to the flare 32 flows from the blower 30 to the filtering unit 34. The filtering unit 34 includes one or more biofilters 38 configured to extract particulates from the producer gas while allowing the gas in which the particulates are suspended to flow. For example, in the illustrated embodiment, the filtering unit 34 includes one or more biofilters 38 that are designed to remove fine particulates from the producer gas. According to certain embodiments, the biofilters 38 may be designed to remove particulates smaller than approximately 1-10 micrometers, and all subranges therebetween. More specifically, the biofilters 38 may be designed to remove particulates smaller than approximately 5 micrometers. Although only a single biofilter is utilized in the illustrated embodiment, any suitable number of one or more biofilters may be utilized in other embodiments, depending on the given application. Features of the biofilters 38 are discussed in more detail below with respect to FIGS. 3 and 4. Nevertheless, in the embodiments of FIGS. 1 and 2, the biofilters, after reaching a usage limit, are recycled back to the biomass gasifier 16, as described above. Specifically, in the embodiment of FIG. 1, the biofilter 38 is recycled back to the feedstock preparation unit 14 for further processing before being fed to the gasifier 16. In the embodiment of FIG. 2, the biofilter 38 is recycled directly into the gasifier 16, bypassing the feedstock preparation unit 14. As previously noted, the foregoing features may reduce waste, increase energy recovery, and increase plant efficiency as compared to traditional systems.

The cleaned and filtered producer gas 97 is directed from the gas cleaning and cooling subsystem 18 through a conduit 96 to the power generation system 20 where the producer gas 97 may be utilized to produce power. For example, the power generation system may include a gas engine (e.g., gas turbine or internal combustion engine) that combusts the producer gas with air 98 to produce power for a downstream application, as indicated by arrow 100. In certain embodiments, this power may be used to directly operate other systems and/or to provide power to a utility grid. During combustion, the gas engine also may generate engine exhaust 102, which may be used to dry feedstock in the preparation unit 14, in some embodiments.

Figure 3:
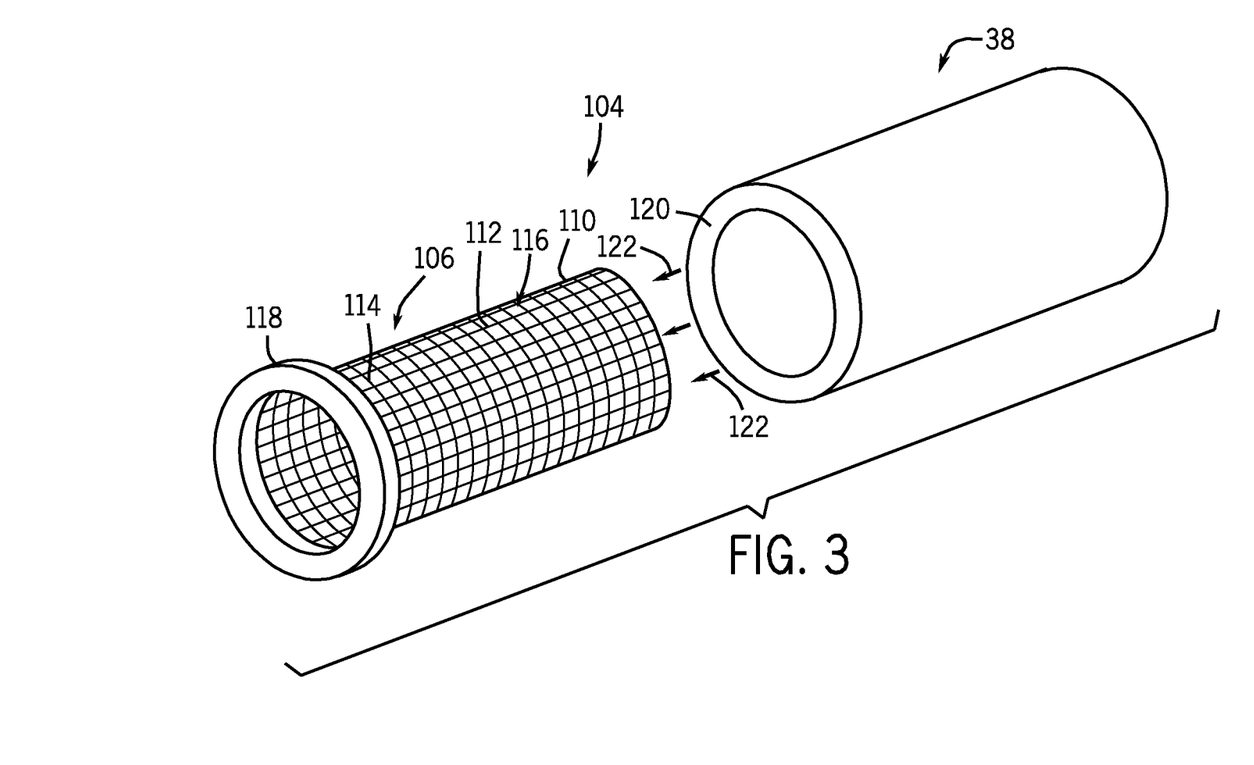
FIG. 3 is an exploded perspective view of an embodiment of a biofilter assembly that may be utilized in the gasification systems of FIGS. 1 and 2.

Turning now to features of the filtering elements that can employed in the biomass gasification systems 10 and 12 of FIGS. 1 and 2, FIG. 3 is an exploded perspective view illustrating an embodiment of a biofilter assembly 104 that may be utilized in the cleaning and cooling subsystem 18. The biofilter assembly 104 includes a support structure 106 and a biofilter 38. In the illustrated embodiment, the support structure 106 is made of a cylindrical mesh 110 having horizontal supports 112 and vertical supports 114 that define apertures 116. The support structure 106 also includes an annular protrusion 118 that may facilitate coupling of the biofilter assembly 104 to other system components. Similarly, the biofilter 38 is a substantially hollow cylinder having an annular wall 120 made of a porous biomaterial. As shown by arrows 122, the hollow cylindrical biofilter 38 is configured to be received by the cylindrical mesh portion 110 of the support structure 106 to form a functional biofilter assembly 104. According to certain embodiments, the biofilter 38 may disposed over the support structure 106 so that the biofilter 38 generally surrounds the support structure 106 and is supported internally by the support structure 106. As shown in FIG. 3, the biofilter 38 is has a sleeve-like shape that can be pulled onto the support structure 106. However, in other embodiments, the shape and/or style of the biofilter 38 may vary. For example, in other embodiments, the biofilters 38 may be a flat material that can be wrapped around the support structure 106.

It should be noted that the biofilter 38 may be any suitable filter that is at least partially made of a biomaterial and is further capable of separating particulate material above a predetermined size limit from a given mixture, which may contain solid, liquid, and/or gas components. According to certain embodiments, the biofilter 38 may be partially or completely formed from biomaterials such as coconut shell fibers, rice husks, banana stems, biomembranes, cotton cloth or fibers, or any other suitable biomaterial. Further, the biofilter 38 may be flexible and conformable to a base structure, such as the support structure 106. Accordingly, the support structure 106 may be made of a variety of suitable materials, such as metal, concrete, and so forth. In other embodiments, the biofilter 38 may have greater structural integrity and the support structure 106 may be omitted. In these embodiments, the biofilter 38 may provide its own structural support. Still further, although the biofilter assemblies 104 illustrated herein are cylindrical, it should be noted that such assemblies are subject to considerable variations in size, shape, and other dimensions, and the shown embodiments are merely examples. For example, in certain embodiments, the biofilter assemblies may be rectangular, elliptical, or trapezoidal in shape, among others.

Figure 4:
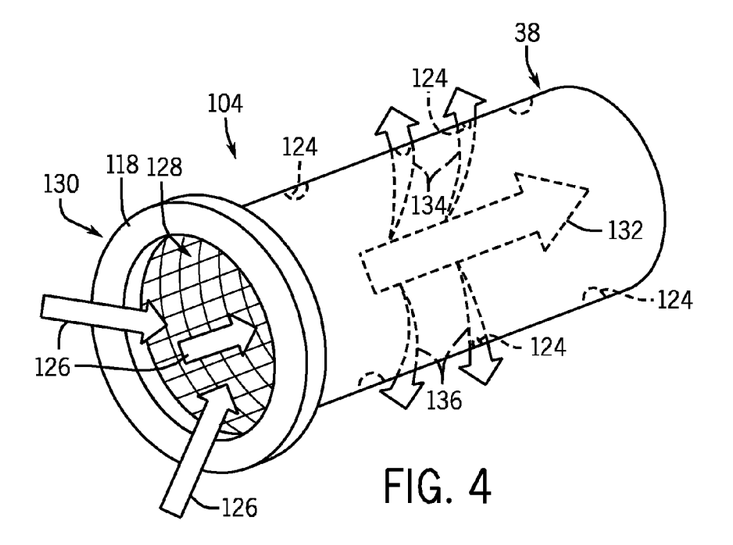
FIG. 4 is an assembled perspective view of the biofilter assembly of FIG. 3 illustrating flow of producer gas in accordance with an embodiment.

FIG. 4 illustrates the biofilter assembly 104 of FIG. 3 as assembled for operation in the gasification systems of FIGS. 1 and 2. As discussed above with respect to FIGS. 1 and 2, the biofilter 38 may receive cooled producer gas 93 from the chilled water scrubber 28. However, in other embodiments, the biofilter assembly 104 may receive other types of particulate laden producer gas (i.e., producer gas having particulates suspended therein), for example, from the scrubbers 24 and 26 and/or from the cyclone 22. As shown by arrows 126 in FIG. 4, particulate laden producer gas is drawn through an aperture 128 disposed in a first end 130 of the biofilter assembly 104. Once inside the biofilter assembly 104, the particulate laden producer gas flows along a horizontal axis of the assembly 104, as shown by arrow 132, and portions of this main flow stream flow radially outward through the apertures 116 (FIG. 3) in the support structure 106 (FIG. 3) to reach the biofilter 38. The biofilter 38 is porous to allow the gaseous components in the particulate laden producer gas to flow through the biofilter 38 and exit the biofilter assembly 104, while retaining particulate matter 124 on the biofilter 38. That is, as shown by arrows 134, portions of the flow stream 132 flow through the biofilter 38 that filters particulate matter 124 from the producer gas. In other words, the particulate laden producer gas is directed toward the biofilter 38 that includes appropriately sized pores for removal of particulate matter above a predetermined size limit.

During filtering, the particulate matter 124 accumulates on the biofilter 38. During operation, substantial amounts of particulate matter 124 become adhered to and/or entrained in the biofilter 38. As such, the biofilter 38 may reach a usage limit beyond which it is no longer capable of retaining optimal functionality (i.e., can no longer properly filter the producer gas). Once the biofilter reaches its usage limit, the biofilter 38 may be replaced with a new biofilter element, and the used biofilter element can be directed to the biomass gasifier, as previously described above with respect to FIGS. 1 and 2. Further, it should be noted that in some embodiments, the entire biofilter assembly 104 may be configured for replacement and recycling to the gasifier. For example, in these embodiments, the support structure 106 (FIG. 3) also may be constructed of a consumable material that can be combusted within the biomass gasifier. Further, in certain embodiments, the support structure 106 may be constructed at least partially of a biomaterial.

Figure 5:
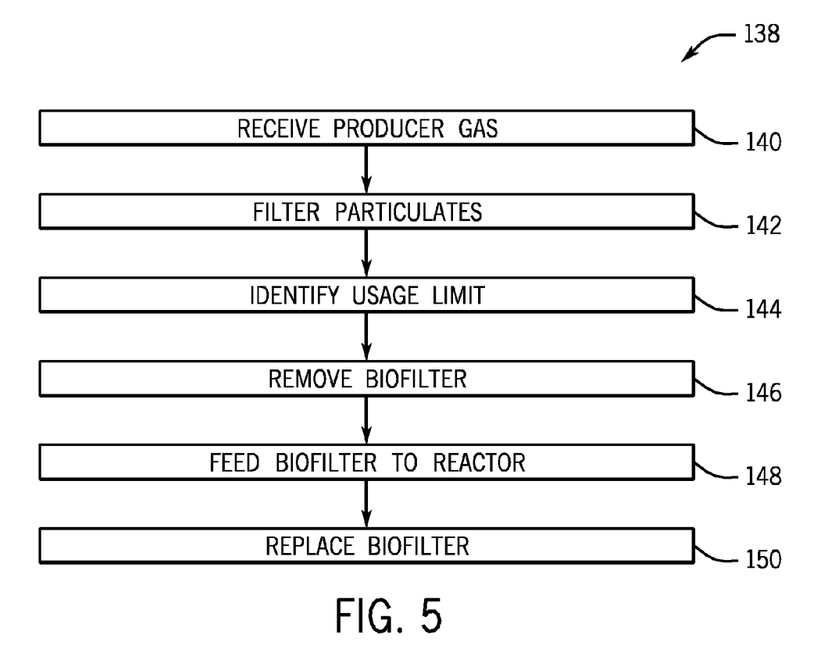
FIG. 5 is a flow chart depicting a method that may be utilized to operate the biofilter assembly of FIGS. 3 and 4 in accordance with an embodiment.

FIG. 5 illustrates a method 138 describing operation of the biofilter assembly in more detail. The method 138 includes receiving (block 140) particulate laden producer gas within the biofilter assembly. For example, the particulate laden producer gas may be directed to the filter unit 34 (FIGS. 1 and 2), and then internal connections within the filter unit 34 may direct the particulate laden producer gas through the biofilter assembly, for example, through the aperture 128 (FIG. 4). As the particulate laden producer gas flows through the biofilter assembly, the biofilter 38 may filter (block 142) particulates from the producer gas. For example, as shown in FIG. 4, the particulates 124 may be collected on the biofilter 38, while the gaseous components flow through the pores of the biofilter 38.

When the amount of particulate matter adhered to the biofilter 38 exceeds a predefined limit, the biofilter element is identified (block 144) as having reached and/or exceeded a usage limit. For example, in certain embodiments, the biofilter 38 may be identified as exceeding a usage limit after a certain time period and/or a certain amount of flow through the biofilter 38. According to certain embodiments, the filter unit 34 may include one or more flow meters, transceivers, or analyzers to assist in identifying (block 144) when the biofilter 38 has exceeded its usage limit. Further, in certain embodiments, a control system may be coupled to the filter unit 34 or to other equipment in the biomass gasification system to facilitate identification of when the biofilter 38 has exceeded its usage limit. Moreover, in other embodiments, any suitable identification method may be employed, for example, such as visual inspection, among others.

The biofilter 38 can then be removed (block 146) from the filter unit 34. For example, in certain embodiments, the biofilter 38 may be removed from the structural support 106 by a manual or automated process. Further, in other embodiments, the entire filter assembly 104 may be removed from the filter unit 34 for recycling to the gasifier. The removed biofilter 38 may then be fed (block 148) to the biomass gasifier. For example, as discussed above with respect to FIG. 1, the biofilter 38 may be directed to the feedstock preparation unit 14, processed in the feedstock preparation unit 14 with the biomass 36, and subsequently fed to the gasifier 16. In another example, as described above with respect to FIG. 2, the biofilter may be directly fed to the gasifier 16. Further, in certain embodiments, the support structure 106 may be fed to the feedstock preparation unit 14 and/or directly to the gasifier 16 along with the biofilter 38. The biofilter 38 and/or the support structure 106 may be directed to the gasifier 16 by a manual process, an automated process, or a combination thereof. Further, in certain embodiments, the biofilter 38 may undergo further processing before entering the feedstock preparation unit 14 and/or the gasifier 16. For example, according to certain embodiments, the biofilter 38 may be cut, crushed, or the like before entering the feedstock preparation unit 14 or the gasifier 16. The biofilter 38 may then be gasified within the gasifier 16. As noted above, the particulates adhered to the biofilter and the biofilter itself may both be utilized as fuel for the gasification process. Finally, the removed biofilter 38 may be replaced (block 150) with an unspent biofilter in the filter unit 34. For example, an unspent biofilter 38 may be disposed on the support structure 106 and placed within the filter unit 34. Further, in embodiments, where the support structure 106 is also directed to the gasifier 16, a new filter assembly 104 may be disposed within the filter unit 34.

As described in detail above, once the biofilters disclosed herein are spent, disclosed embodiments provide for recycling of the used biofilters that contain energy stored as elemental fuel in the form of carbon, hydrogen, and oxygen. That is, the used biofilters may be gasified in a biomass gasifier to utilize the stored energy. In this way, the biofilters described herein may be utilized as a biomass feed source for the biomass gasifier. The foregoing features of disclosed embodiments may offer distinct advantages over traditional biomass gasification systems that typically do not utilize biomaterials in the fine particulate filters. For example, one technical effect of presently disclosed embodiments is that the fine particulate matter (e.g., tar) adhered to the used biofilters may be reused after being filtered from the producer gas. Further, another technical effect is that the need to dispose of the used filters may be eliminated in certain embodiments, thus reducing waste, increasing energy recovery, and increasing plant efficiency. That is, the disclosed embodiments use the spent biofilter and its captured particulates as additional feedstock, rather than discarding the filter and wasting the particulate and further adding to landfills.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A biomass gasification system, comprising:
   a biofilter assembly configured to be disposed within a filter unit of the biomass gasification system and configured to filter particulate matter from a producer gas flowing through the filter unit while allowing a remainder of the producer gas to pass through the biofilter assembly, wherein the biofilter assembly comprises:
   a support structure; and
   a biofilter disposed on the support structure and comprising a biomaterial configured to be gasified in a biomass gasification reactor of the biomass gasification system; and
   a biofilter recycling system configured to direct the biofilter from the filter unit to the biomass gasification reactor when a usage of the biofilter is greater than a predefined usage limit.

2. The biomass gasification system of claim 1, wherein the biomaterial comprises one or more biodegradable materials of plant origin.

3. The biomass gasification system of claim 1, wherein the biomaterial comprises coconut shell fibers, cotton cloth, biomembranes, or a combination thereof.

4. The biomass gasification system of claim 1, wherein the support structure comprises a cylindrical mesh support structure, and wherein the biofilter comprises a hollow cylinder configured to be received by the cylindrical mesh support structure.

5. The biomass gasification system of claim 1, wherein the support structure comprises a second biomaterial configured to be gasified by the biomass gasification reactor, and the biofilter recycling system is configured to direct the support structure from the filter unit to the biomass gasification reactor when the usage of the biofilter is greater than the predefined usage limit.

6. The biomass gasification system of claim 1, wherein the biofilter is configured to retain particles greater than approximately 1 micrometer.

7. A biomass gasification system, comprising:
a feedstock preparation unit configured to process biomass to generate a biomass feedstock;
a biomass gasification reactor configured to gasify the biomass feedstock in the presence of air to generate a producer gas;
a filter unit comprising a biofilter configured to filter particulate matter from the producer gas to generate a reduced particulate producer gas, wherein at least a portion of the biofilter comprises a biomaterial configured to be gasified in the biomass gasification reactor; and
a filter control system configured to identify when a usage of the biofilter is greater than a predefined usage limit based at least in part on a predefined amount of particulate matter adhered to the biofilter, a predefined time period, or a predefined flow of reduced particulate producer gas, or any combination thereof, wherein the biofilter is configured to be directed from the filter unit to the feedstock preparation unit or to the biomass gasification reactor when the filter control system identifies the usage of the biofilter to be greater than the predefined usage limit.

8. The biomass gasification system of claim 7, wherein the biomass gasification reactor comprises an open top configured to direct the air into the biomass gasification reactor and nozzles configured to direct additional air into a combustion zone of the biomass gasification reactor.

9. The biomass gasification system of claim 7, wherein the feedstock preparation unit is configured to process the biomaterial of the biofilter along with the biomass to generate the biomass feedstock.

10. The biomass gasification system of claim 7, comprising a cyclone configured to separate particulates from the producer gas upstream of the filter unit.

11. The biomass gasification system of claim 7, comprising one or more scrubbers configured to scrub the producer gas upstream of the filter unit.

12. The biomass gasification system of claim 7, comprising:

a cyclone configured to remove particulates from the producer gas to generate a producer gas mixture; and
one or more scrubbers configured to scrub the producer gas mixture to generate a scrubbed producer gas mixture;
wherein the filter unit is configured to receive and to filter the scrubbed producer gas mixture.

13. The biomass gasification system of claim 7, comprising a power generation system configured to combust the reduced particulate producer gas to generate power.

14. A method, comprising:
directing a producer gas through a biofilter to remove particulates from the producer gas, wherein the biofilter comprises a biomaterial; and
feeding the biofilter to a biomass gasification reactor to gasify the particulates.

15. The method of claim 14, wherein directing the producer gas through the biofilter comprises retaining the removed particulates on the biomaterial.

16. The method of claim 14, wherein feeding the biofilter to the biomass gasification reactor comprises directing the biofilter to a feedstock preparation unit that generates a biomass feedstock for the biomass gasification reactor.

17. The method of claim 14, wherein feeding the biofilter to the biomass gasification reactor comprises combining the biofilter with a biomass feedstock exiting a feedstock preparation unit.

18. The method of claim 14, wherein feeding the biofilter to the biomass gasification reactor comprises directing the biofilter through an open top of a downdraft biomass gasification reactor.

19. The method of claim 14, comprising gasifying a biomass feedstock in the biomass gasification reactor to generate the producer gas.

20. The method of claim 14, comprising scrubbing the producer gas upstream of the biofilter to remove particulate matter that is larger in size than the particulates.

* * * * *